(12) United States Patent
Park et al.

(10) Patent No.: US 11,332,667 B2
(45) Date of Patent: May 17, 2022

(54) COMPOSITION FOR WASHING PICKLED STEEL PLATE, METHOD FOR WASHING PICKLED STEEL PLATE BY USING SAME, AND STEEL PLATE OBTAINED THEREBY

(71) Applicant: POSCO, Pohang-si (KR)

(72) Inventors: Rho-Bum Park, Gwangyang-si (KR); Yon-Kyun Song, Gwangyang-si (KR); Ji-Hoon Park, Gwangyang-si (KR); Hoon Yun, Gwangyang-si (KR); Seok-Chan Choe, Gwangyang-si (KR); Kyoung-Pil Ko, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 17/317,317

(22) Filed: May 11, 2021

(65) Prior Publication Data

US 2021/0261862 A1    Aug. 26, 2021

Related U.S. Application Data

(62) Division of application No. 16/062,926, filed as application No. PCT/KR2016/014897 on Dec. 19, 2016, now Pat. No. 11,028,322.

(30) Foreign Application Priority Data

| Dec. 18, 2015 | (KR) | ........................ 10-2015-0181791 |
| Dec. 23, 2015 | (KR) | ........................ 10-2015-0184674 |
| May 23, 2016 | (KR) | ........................ 10-2016-0063035 |

(51) Int. Cl.

| *C09K 15/32* | (2006.01) |
| *B08B 3/08* | (2006.01) |
| *C09D 5/08* | (2006.01) |
| *C09D 179/02* | (2006.01) |
| *C23G 1/08* | (2006.01) |

(52) U.S. Cl.
CPC ............... *C09K 15/32* (2013.01); *B08B 3/08* (2013.01); *C09D 5/08* (2013.01); *C09D 179/02* (2013.01); *C23G 1/083* (2013.01)

(58) Field of Classification Search
None
See application file for complete search history.

(56) References Cited

U.S. PATENT DOCUMENTS

| 2,564,549 | A | * | 8/1951 | Stargardter | ............ | C23G 1/086 |
| | | | | | | 134/3 |
| 3,561,262 | A | * | 2/1971 | Borucki | .................. | G01N 21/91 |
| | | | | | | 73/104 |
| 3,915,812 | A | * | 10/1975 | Yamagishi | ................. | C25F 1/00 |
| | | | | | | 205/140 |
| 4,390,465 | A | | 6/1983 | Spekman, Jr. | | |
| 4,828,721 | A | | 5/1989 | Bollier et al. | | |
| 5,851,304 | A | * | 12/1998 | Giraud | ..................... | C23G 1/08 |
| | | | | | | 134/3 |
| 5,853,490 | A | | 12/1998 | Dunn et al. | | |
| 5,977,041 | A | | 11/1999 | Honda | | |
| 5,992,196 | A | * | 11/1999 | Giraud | .................. | C23G 1/086 |
| | | | | | | 72/39 |
| 9,139,800 | B2 | * | 9/2015 | Monsrud | ............. | C11D 11/0023 |
| 10,689,765 | B2 | * | 6/2020 | Watanabe | ............... | B08B 3/048 |
| 2002/0183224 | A1 | | 12/2002 | Peterson et al. | | |
| 2013/0146102 | A1 | * | 6/2013 | Monsrud | ............. | C11D 11/0023 |
| | | | | | | 134/28 |
| 2014/0107008 | A1 | | 4/2014 | Fu et al. | | |
| 2015/0013716 | A1 | | 1/2015 | Masuoka et al. | | |

FOREIGN PATENT DOCUMENTS

| CN | 103643226 | 3/2014 |
| CN | 103725455 | 4/2014 |
| CN | 104053820 | 9/2014 |
| CN | 104120439 | 10/2014 |
| JP | 63224769 | 9/1988 |
| JP | 09031677 | 2/1997 |
| JP | 2000178775 | 6/2000 |
| JP | 2003129261 | 5/2003 |
| JP | 3441715 | 9/2003 |
| JP | 2004161911 | 6/2004 |
| JP | 2005314725 | 11/2005 |
| JP | 2006002207 | 1/2006 |
| JP | 2006028574 | 2/2006 |
| JP | 2006045646 | 2/2006 |
| JP | 2009041078 | 2/2009 |
| JP | 2010007140 | 1/2010 |
| JP | 2011032529 | 2/2011 |

(Continued)

OTHER PUBLICATIONS

Chinese Office Action—Chinese Application No. 201680074270.4 dated Jul. 23, 2019, citing CN104053820, U.S. Pat. No. 4,390,465, CN103643226, WO02087340, CN103725455 and JP2006002207.
European Search Report—European Application No. 16876102.1 dated Oct. 12, 2018, citing U.S. Pat. No. 4,390,465, CN 104 120 439, CN 103 643 226, WO 02/087,340 and WO 2008/068152.
International Search Report—PCT/KR2016/014897 dated May 25, 2017.
Japanese Office Action—Japanese Application No. 2018-531205 dated Jul. 23, 2019, citing JP 2010-007140, JP 2005-314725, JP 2006-045646, JP 2003-129261, JP 2012-188679, JP 2004-161911, JP 2016-065153, JP 2009-041078, JP 2013-237924, JP 2000-178775, JP 2006-028574, U.S. Appl. No. 04/390,465 and U.S. Appl. No. 05/853,490.

*Primary Examiner* — Joseph D Anthony
(74) *Attorney, Agent, or Firm* — Cantor Colburn LLP

(57) ABSTRACT

A composition for washing a pickled steel plate and a method for washing a pickled steel plate using the same are provided. The composition for washing a pickled steel plate includes a phosphoric acid ester compound, an amine-based compound, sodium carbonate, ammonium acetate, ethylene diamine tetraacetic acid (EDTA) and a remainder of water, and the method for washing a pickled steel plate is performed using the same.

10 Claims, No Drawings

(56) References Cited

FOREIGN PATENT DOCUMENTS

| | | |
|---|---|---|
| JP | 2012188679 | 10/2012 |
| JP | 2013237924 | 11/2013 |
| JP | 2014080614 | 5/2014 |
| JP | 2016065153 | 4/2016 |
| KR | 20020052734 | 7/2002 |
| KR | 100805727 | 2/2008 |
| KR | 20140099320 | 8/2014 |
| WO | 02087340 | 11/2002 |
| WO | 2008068152 | 6/2008 |

* cited by examiner

COMPOSITION FOR WASHING PICKLED STEEL PLATE, METHOD FOR WASHING PICKLED STEEL PLATE BY USING SAME, AND STEEL PLATE OBTAINED THEREBY

TECHNICAL FIELD

The present disclosure relates to a composition for washing a pickled steel plate and a method for washing a pickled steel plate using the same, and more particularly, to a composition for washing, used in a pickling process for obtaining a steel plate having excellent surface quality by preventing yellowing caused by reoxidation of the surface of a steel plate after pickling, and a method for washing using the same.

Furthermore, the present disclosure relates to a steel plate subjected to the washing process described above.

BACKGROUND ART

In general, various types of oxide films are formed on the surface of a hot-rolled steel plate obtained by heat treatment at a high temperature followed by hot rolling, the surface of some cold-rolled steel plates obtained by cold rolling followed by water-cooling in the continuous annealing process, or the surface of a steel plate that has been exposed to the atmosphere over a certain period of time. Since such an oxide film deteriorates post-processing quality, the oxide film is removed in the pickling process.

The pickling process includes steps of: pickling, for removing an oxide film from a surface of a steel plate with an acid solution; washing, for removing the acid solution remaining on the steel plate during pickling; and drying, for removing water remaining during washing. However, there is a problem in that the surface of the steel plate may be reoxidized in the washing and the drying, thus darkening and yellowing the surface of the steel plate.

In particular, high-strength steels are susceptible to yellowing due to reoxidation, because they contain a large amount of strong oxidizing components such as manganese, silicon, aluminum, and magnesium. Thereamong, yellowing occurs more severely on a steel plate containing at least 1.0 wt % of manganese.

Since such an oxide film formed on the surface of the steel plate after pickling acts as a factor deteriorating the quality of phosphate processing, plating or coating in the post-processing, a technique for preventing the yellowing of the surface of the steel plate after pickling is required.

As typical methods for preventing the yellowing in the pickling process, representative examples can be found in the technologies described in KR2000-0082171, KR2006-0079405, US2002-201705, and JP2001-319765, incorporated herein in its entirety by reference.

KR 2000-0082171 discloses a technique for preventing corrosion of a hot-rolled steel plate during a washing process by neutralizing the pH of the washing solution using sodium hydroxide. Meanwhile, K R 2006-0079405 discloses a stain and rust inhibitor for pickling a steel plate containing: 40 to 80 vol % of one or two or more of alkylamine, alkyldiamine, and alkyltetramine; 10 to 50 vol % of tetrahydro-1,4-oxazine as a high temperature stabilizer; and at least 10 vol % of anhydrous citric acid as a solution stabilizer.

In addition, US2002-201705 discloses a technique for immobilizing a surface by treating with a solution of gluconate and polyquaternium compound, and JP2001-319765 discloses a technique for treating a discoloration inhibitor produced by the reaction of carboxylic acid and an alkali agent in a discoloration preventing tank following the pickling, and then removing the discoloration inhibitor in a washing tank.

However, the related technologies described above are not satisfactory in terms of yellowing prevention capability, and in particular, yellowing prevention capability is even farther from a satisfactory level when it comes to high-strength steels as described above.

Therefore, it is expected that a composition for washing and a method using the same will be widely used in the related field, when it is capable of improving surface quality of a steel plate by preventing yellowing.

DISCLOSURE

Technical Problem

Accordingly, an aspect of the present disclosure is to provide a composition for washing a pickled steel plate, capable of preventing reoxidization of a surface of the steel plate after pickling, thus inhibiting yellowing and thereby obtaining a steel plate having excellent surface quality.

Another aspect of the present disclosure is to provide a method for washing a pickled steel plate using the composition for washing of the present disclosure.

In addition, the present disclosure is to provide a steel plate treated with an anti-yellowing treatment in a washing stage of the pickling process, to prevent yellowing caused by reoxidation of the surface of the steel plate after pickling.

Technical Solution

In one aspect, the present disclosure provides a composition for washing a pickled steel plate, which may include 6 to 14 wt % of a phosphoric acid ester compound, 6 to 19 wt % of an amine-based compound, 1 to 9 wt % of sodium carbonate, 1 to 9 wt % of ammonium acetate, 1 to 14 wt % of ethylene diamine tetraacetic acid (EDTA) and a remainder of water.

In another aspect, the present disclosure provides a composition for washing a pickled steel plate, which may include 15 to 24 wt % of a phosphoric acid ester compound, 5 to 15 wt % of citric acid, 2 to 10 wt % of sodium carbonate, 2 to 7 wt % of sodium acetate, 1 to 7 wt % of diethylene tetramine pentaacetic acid (DTPA), and a remainder of water.

In each of the compositions for washing as described above, the phosphoric acid ester compound is at least one selected from the group consisting of bisphenol A-bis(diphenyl phosphate), triaryl phosphate isopropylate, dimethylmethyl phosphate, tetraphenyl m-phenylene bis(phosphate), triethyl phosphate and triphenyl phosphate.

The amine-based compound is at least one selected from the group consisting of ethylamine, methylamine, propylamine, butylamine, polyethylamine, polypropylamine, polybutylamine and polyarylamine.

In each of the compositions for washing as described above, the composition for washing may have a pH of at least 8.0, or in more detail, a pH of 8.5 to 11.5.

Each of the compositions for washing in an amount of 0.05 to 1.5 wt % may be diluted with water.

In another aspect of the present disclosure, a method for washing a pickled steel plate is provided, which may include preparing a composition for washing a pickled steel plate by mixing 6 to 14 wt % of a phosphoric acid ester compound, 6 to 19 wt % of an amine-based compound, 1 to 9 wt % of sodium carbonate, 1 to 9 wt % of ammonium acetate, 1 to 14 wt % of EDTA, and a remainder of water, and diluting the composition for washing with water, and immersing the pickled steel plate in the composition for washing.

In another aspect of the present disclosure, there is provided a method for washing, which may include preparing a composition for washing a pickled steel plate by mixing 15 to 24 wt % of a phosphoric acid ester compound, 5 to 15 wt % of citric acid, 2 to 10 wt % of sodium carbonate, 2 to 7 wt % of sodium acetate, 1 to 7 wt % of diethylene tetramine pentaacetic acid (DTPA), and a remainder of water, and diluting the composition for washing with water, and immersing the pickled steel plate in the composition for washing.

The diluting the composition for washing with water in each of the methods for washing described above is performed by diluting 0.05 to 1.5 wt % of the composition for washing with water.

In each of the methods for washing described above, the phosphoric acid ester compound is at least one selected from the group consisting of bisphenol A-bis(diphenyl phosphate), triaryl phosphate isopropylate, dimethylmethyl phosphate, tetraphenyl m-phenylene bis(phosphate), triethyl phosphate and triphenyl phosphate.

The amine-based compound is at least one selected from the group consisting of ethylamine, methylamine, propylamine, butylamine, polyethylamine, polypropylamine, polybutylamine and polyarylamine.

In each of the methods for washing described above, the composition for washing may have a pH of at least 8.0.

Another aspect of the present disclosure is to provide an anti-yellowing treated steel plate, in which the steel plate contains at least 1.0 wt % of Mn, and also contains a component of 0.01 to 5 mg/m$^2$ of P, 0.01 to 500 mg/m$^2$ of C, and 0.1 to 500 mg/m$^2$ of O other than the steel component on the surface of the steel plate after pickling and washing.

The steel plate may have a yellowness index of at most 4.0 and a whiteness index of at least 55.

The surface of the steel plate may contain 0.01 to 5 mg/m$^2$ of at least one component selected from the group consisting of N, F, Na, Al, Si, S, K, Ca, Ti, V, Cr, Mn, Co, Ni, Cu, Cl, Zn, Zr and Mo, in addition to the steel components.

The steel plate may include a Ni or Zn plated layer obtained by Ni flash plating or Zn flash plating.

The steel plate may include a phosphate treated layer treated with a phosphate treatment solution.

The steel plate may include a plated layer obtained by hot-dip plating or electroplating that includes at least one of Zn, Al, Mg, and Si.

The steel plate may include a resin layer obtained by applying a resin composition thereto.

The steel plate may be coated with an anti-corrosive oil.

Effects of the Invention

According to the present disclosure, by significantly improving the yellowing prevention capability in the pickling process of a steel plate, excellent surface quality, free from yellowing, may be obtained, even in the production of a large high-strength steel plate containing a large amount of high-oxidation steel components.

In addition, according to the present disclosure, in a high-strength steel plate containing a large amount of high-oxidation steel components, the yellowing caused in the pickling process of the steel plate is prevented, and as a result, there is an effect that a surface quality of a product using the steel plate and of various subsequently treated products may be enhanced.

BEST MODE FOR INVENTION

Hereinafter, preferred embodiments of the present disclosure will be described. However, the embodiments of the present disclosure may be modified to have various other forms, and the scope of the present disclosure is not limited to the embodiments described below.

Generally, various types of oxide films are formed on the surface of a hot-rolled steel plate obtained by heat treatment at a high temperature followed by hot rolling, the surface of some cold-rolled steel plates obtained by cold rolling followed by water-cooling in the continuous annealing process, or the surface of a steel plate that has been exposed to the atmosphere over a certain period of time. Since such an oxide film deteriorates the post-processing quality, the oxide film is removed in the pickling process.

The pickling process includes steps of: pickling, for removing an oxide film from a surface of a steel plate with an acid solution; washing, for removing the acid solution remaining on the steel plate during pickling; and drying, for removing water remaining during washing. However, there is a problem in that the surface of the steel plate is reoxidized in the washing and the drying, thus darkening the surface of the steel plate. In particular, since high-strength steels contain many strong oxidizing steel components such as manganese, silicon, aluminum, and magnesium, the deterioration of the whiteness index due to reoxidation occurs more severely.

Accordingly, the present disclosure provides a composition for washing in a pickling process and a method for washing using the same, which are capable of obtaining a steel plate having excellent surface quality by preventing reoxidation and yellowing of the surface of the steel plate after pickling.

According to one aspect of the present disclosure, there is provided a composition for washing a pickled steel plate comprising a phosphoric acid ester compound, an amine-based compound, sodium carbonate, ammonium acetate, ethylene diamine tetraacetic acid (EDTA) and a remainder of water. The composition for washing includes 6 to 14 wt % of a phosphoric acid ester compound, 6 to 19 wt % of an amine-based compound, 1 to 9 wt % of sodium carbonate, 1 to 9 wt % of ammonium acetate, 1 to 14 wt % of EDTA, and a remainder of water.

In an aspect of the present disclosure, the phosphoric acid ester compound may be at least one selected from the group consisting of bisphenol A-bis(diphenyl phosphate), triaryl phosphate isopropylate, dimethylmethyl phosphate, tetraphenyl m-phenylene bis(phosphate), triethyl phosphate and triphenyl phosphate.

When less than 6 wt % of phosphoric acid ester compound is added, there is a problem in that satisfactory yellowing prevention capability may not be exhibited, and when above 14 wt % of phosphoric acid ester compound is added, there is a problem in that a stain occurs on the steel plate during washing. In more detail, the phosphoric acid ester compound is contained in an amount of 8 to 12 wt %.

According to the present disclosure, the amine-based compound may be at least one selected from the group consisting of ethylamine, methylamine, propylamine, butylamine, polyethylamine, polypropylamine, polybutylamine and polyarylamine.

When less than 6 wt % of an amine-based compound is added, there is a problem in that satisfactory yellowing prevention capability may not be exhibited, and when above 19 wt % of an amine-based compound is added, there is a problem in that stain occurs on the steel plate during washing. In more detail, the amine-based compound is contained in an amount of 10 to 14 wt %.

Sodium carbonate is a component used for adjusting the pH of the washing solution composition of the present disclosure, and when sodium carbonate is present in an amount less than 1 wt %, there is a problem in that it is difficult to adjust the pH to a favorable value for preventing yellowing, and when above 9 wt %, there is a problem in that deposits may be generated during washing. In more detail, the sodium carbonate is contained in an amount of 4 to 8 wt %.

The ammonium acetate is a component used for adjusting the pH of the washing solution composition of the present disclosure and improving the solution stability, and when the ammonium acetate is present in an amount less than 1 wt %, there is a problem in that deposits may be generated during washing, and when above 9 wt %, there is a problem in that the effect is saturated and malodor may be generated. In more detail, the ammonium acetate is contained in an amount of 3 to 7 wt %.

The ethylene diamine tetraacetic acid (EDTA) is a component used for suppressing the yellowing of the washing solution composition of the present disclosure, and when below 1 wt %, there is a problem in that satisfactory yellowing prevention capability may not be exhibited, and when above 14 wt %, there is a problem in that the solution stability is deteriorated. In more detail, the EDTA is contained in an amount of 6 to 10 wt %.

Furthermore, the composition for washing a pickled steel plate according to the present disclosure includes a remainder of water. That is, the water is contained in an amount such that the water and the other components of the composition for washing a pickled steel plate of the present disclosure total the total amount of 100 wt %. According to the present disclosure, the water may be purified water.

Meanwhile, according to another aspect of the present disclosure, there is provided a composition for washing a pickled steel plate including a phosphoric acid ester compound, citric acid, sodium carbonate, sodium acetate, DTPA (diethylene tetramine pentaacetic acid) and a remainder of water, in which the composition for washing includes 15 to 24 wt % of a phosphoric acid ester compound, 5 to 15 wt % of citric acid, 2 to 10 wt % of sodium carbonate, 2 to 7 wt % of sodium acetate, 1 to 7 wt % of DTPA, and a remainder of water.

In an aspect of the present disclosure, the phosphoric acid ester compound may be at least one selected from the group consisting of bisphenol A-bis(diphenyl phosphate), triaryl phosphate isopropylate, dimethylmethyl phosphate, tetraphenyl m-phenylene bis(phosphate), triethyl phosphate and triphenyl phosphate.

When less than 15 wt % of phosphoric acid ester compound is added, there is a problem in that satisfactory whiteness index enhancement capability may not be exhibited, and when above 25 wt %, there is a problem in that stain occurs on the steel plate during washing. In more detail, the phosphoric acid ester compound is contained in an amount of 18 to 21 wt %.

The citric acid is a component that enables enhancement of a whiteness index of high-strength steel, and when less than 5 wt % of phosphoric acid ester compound is added, there is a problem in that satisfactory whiteness index enhancement capability may not be exhibited, and when above 15 wt %, there is a problem in that deposits may be generated during washing. In more detail, the citric acid may be contained in an amount of 9 to 13 wt %.

The sodium carbonate is a component used for adjusting the pH of the washing solution composition of the present disclosure, and when sodium carbonate is present in an amount less than 2 wt %, there is a problem in that it is difficult to adjust the pH to a favorable value for improving whiteness index, and when above 10 wt %, there is a problem in that deposits may be generated during washing. In more detail, the sodium carbonate may be contained in an amount of 4 to 8 wt %.

The sodium acetate is a component used for adjusting the pH of the washing solution composition of the present disclosure and improving the solution stability, and when the sodium acetate is present in an amount less than 2 wt %, there is a problem in that deposits may be generated during washing, and when above 12 wt %, there is a problem in that the effect is saturated and stain may be generated on the steel plate. In more detail, the sodium acetate may be contained in an amount of 5 to 9 wt %.

The diethylene tetramine pentaacetic acid (DTPA) is a component used for improving whiteness index of the washing solution composition of the present disclosure, and when the DTPA is present in an amount less than 1 wt %, there is a problem in that satisfactory whiteness index enhancement capability may not be exhibited, and when above 7 wt %, there is a problem in that the solution stability is deteriorated. In more detail, the DTPA may be contained in an amount of 2 to 4 t wt %.

Furthermore, the composition for washing a pickled steel plate according to the present disclosure includes a remainder of water. That is, the water is contained in an amount such that the water and the other components of the composition for washing a pickled steel plate of the present disclosure total the total amount of 100 wt %. According to the present disclosure, the water may be purified water.

In some embodiments, each of the compositions for washing a pickled steel plate, provided according to the respective aspects of the present disclosure, is adjusted in pH to reduce the corrosion rate of the steel plate, and the composition for washing may have a pH of at least 8.0, and in more detail, the composition for washing has a pH of 8.5 to 11.5.

When the pH of the composition for washing a pickled steel plate of the present disclosure is less than 8.0, there is a problem in that the corrosion rate reduction effect is insufficient and therefore, satisfactory yellowing prevention capability may not be exhibited. On the other hand, when the composition for washing a pickled steel plate having a pH of at least 8.0 is used, as described in the present disclosure, the steel plate may be washed in regions of weak corrosion or in stable regions so that the yellowing prevention capability may be enhanced.

When the composition for washing according to the present disclosure is applied to washing of a pickled steel plate, the composition may be diluted with additional water before use. For example, 0.05 to 1.5 wt % of the composition may be diluted with water. When the concentration of the diluted composition for washing is less than 0.05 wt %, there is a problem in that satisfactory yellowing prevention capability may not be exhibited, and when above 1.5 wt %, there is a problem of deteriorated economic feasibility, because adding the composition until after the effect is saturated is economically meaningless.

The pickled steel plate to which the composition for washing according to the present disclosure may be applied is not particularly limited, although the steel may be a steel plate pickled in any process of pickling steel, such as a hot-rolled pickling process, a hot-rolled pickling oiling process, a hot-rolled pickling plating process, a continuous annealing process, a stainless process, a hot-dip plating process, an electrogalvanizing process, and the like.

As described above, when washing is performed in the pickling process using the composition for washing according to the present disclosure described above, the yellowing of the high-strength steel plate may be suppressed, and therefore, the steel plate having excellent whiteness index may be obtained.

A method for washing a pickled steel plate according to the present disclosure may include preparing a composition for washing a pickled steel plate, respectively by mixing a phosphoric acid ester compound, an amine-based compound, sodium carbonate, ammonium acetate, ethylene diamine tetraacetic acid (EDTA) and a remainder of water; or by mixing a phosphoric acid ester compound, citric acid, sodium carbonate, sodium acetate, diethylene tetramine pentaacetic acid (DTPA) and a remainder of water; diluting each composition for washing with water; and immersing the pickled steel plate in each composition for washing.

In the method for washing the pickled steel plate according to the present disclosure, each of the components of the composition for washing and content thereof are as described above.

Further, as described above, when diluting each composition for washing with water, it is possible to dilute 0.05 to 1.5 wt % of each composition for washing with water. When the concentration of the diluted composition for washing is less than 0.05 wt %, there is a problem in that satisfactory yellowing prevention capability may not be exhibited, and when above 1.5 wt %, there is a problem of deteriorated economic feasibility, because adding the composition until after the effect is saturated is economically meaningless.

Meanwhile, the immersing is performed at room temperature for 1 to 60 seconds, or in more detail, for 5 to 20 seconds, such as for about 10 seconds, for example. Accordingly, using the composition for washing according to the present disclosure enables sufficient washing even for a short time at room temperature and also prevents the yellowing of the steel plate.

Furthermore, the method for washing according to the present disclosure may further include drying that is not particularly limited. For example, drying may be performed by, for example, a hot air drying method, an oven drying method, or the like.

The steel plate washed with the composition for washing described above may suppress the yellowing of the surface. In more detail, the high-strength steel containing a large amount of Mn may be washed using each composition described above to further improve the anti-yellowing effect. Particularly effective result is expected when the composition is applied to the high-strength steel plate including Mn. It may be possible to apply the composition to a steel plate that contains at least 1.0 wt % of Mn among the steel components of the steel plate.

The steel plate containing less than 1.0 wt % of Mn has anti-yellowing capability after pickling and does not suffer severe yellowing. Therefore, such a steel plate, which is not susceptible to yellowing, is not necessarily subjected to a separate anti-yellowing treatment. Meanwhile, a steel plate containing at least 1.0 wt % of Mn has yellowing after pickling, and in this case, the steel plate with yellowing needs to be subjected to an anti-yellowing treatment, because it will deteriorate the quality, such as phosphate processability, Ni flash treatment ability, paintability or the like in the subsequent process after the pickling.

The steel plate subjected to the anti-yellowing treatment using the composition for washing provided according to the present disclosure contains P, C, and O as components other than the steel components on the surface of the steel plate.

P and C are residues of the oxidation inhibiting components of the composition for washing which remain on the surface of the steel plate after drying in the process of washing after pickling of the steel plate. Meanwhile, 0 is an element detected from the oxidation inhibiting components contained in the washing solution and the oxide component inevitably formed on the surface of the steel plate during the washing process after pickling.

When P, C, and O are attached to the surface of the steel plate after washing by a predetermined amount, the steel plate may be inhibited from being reoxidized in the process of washing and drying after washing. In some embodiments, 0.01 to 5 mg/m$^2$ of P may be attached to the surface of the pickled and washed, anti-yellowing treated steel plate of the present disclosure. When the coating amount of P is less than 0.01 mg/m$^2$, sufficient anti-yellowing effect may not be exhibited, and when the coating amount of P is greater than 5 mg/m$^2$, there is a problem in that stain occurs on the steel plate and the surface is rather darkened.

In some embodiments, the anti-yellowing treated steel plate of the present disclosure may have not only P, but also 0.01 to 500 mg/m$^2$ of C attached to the surface of the steel plate. When the coating amount of C is less than 0.01 mg/m$^2$, there is a problem in that sufficient anti-yellowing may not be exhibited, and when the coating amount of C is more than 500 mg/m$^2$, there is a problem in that the surface appearance degrades and the phosphate processability also deteriorates in the subsequent process.

Further, in some embodiments, the anti-yellowing treated steel plate of the present disclosure may contain 0 as well as P and C, and in more detail, 0.1 to 500 mg/m$^2$ of 0 may be attached. When the coating amount of 0 is less than 0.1 mg/m$^2$, there is a problem in that sufficient anti-yellowing may not be exhibited, and when above 500 mg/m$^2$, there is a problem in that severe yellowing causes a poor surface appearance, and also the deteriorated phosphate processability in the post-processing.

In addition, the anti-yellowing treated steel plate of the present disclosure may further contain N, F, Na, Al, Si, S, K, Ca, Ti, V, Cr, Mn, Co, Ni, Cu, Cl, Zn, Zr, Mo as well as P, C, and O, in addition to the steel component on the surface of the steel plate. These components may contain one, or two or more components.

At this time, the components mentioned above may be present such that a total coating amount thereof is 0.01 to 5 mg/m$^2$. When the total coating amount of the additional components described above is less than 0.01 mg/m$^2$, the effect of suppressing the occurrence of minute stains on the surface is insignificant, and when the coating amount is above 5 mg/m$^2$, there is a problem in that it rather causes increased occurrence of stains and deteriorated surface appearance.

The anti-yellowing treated steel plate according to an embodiment of the present disclosure may suppress the yellowing of the pickled and washed steel plate as a predetermined amount of P, C, and O are attached to the surface of the pickled and washed steel plate as described above. The quality of the anti-yellowing treated steel plate may be represented by the yellowness index and whiteness index measured by a colorimeter (Minolta Spectrophotometer, CM3700d), and in some embodiments, the yellowness index of the steel plate surface is less than 4.0 and the whiteness index is at least 55. The lower yellowness index of the surface of the steel plate, which does not exceed 4.0, results in improved surface appearance, and when the yellowness index exceeds 4.0, there is a problem in that the surface appearance is poor and the phosphate processability is deteriorated in post-processing.

Meanwhile, in some embodiments, the surface whiteness index of the anti-yellowing treated steel plate may be at least 55. The higher whiteness index, which is no less than 55, results in more enhanced anti-yellowness and superior surface appearance, and when the whiteness index is less than 55, there is a problem in that the surface appearance is poor and the phosphate processability in a post-processing is deteriorated.

As described above, the anti-yellowing treated steel plate according to one embodiment of the present disclosure may effectively suppress the occurrence of yellowing due to reoxidation of the steel plate after pickling, washing, and drying, and may be produced in any process of pickling the steel plate, such as a subsequent hot-rolled pickling process, a hot-rolled pickling inunction process, a hot-rolled pickling plating process, a continuous annealing process, a stainless process, a hot-dip plating process, an electrogalvanizing process, and the like.

As described above, the anti-yellowing treated steel plate may be produced by applying an oxidation inhibitor composition capable of providing P, C, and O on the surface of the steel plate in the coating amount mentioned above to wash the pickled steel plate and drying the same.

At this time, the oxidation inhibitor composition is not particularly limited as long as it contains components that are capable of attaching P, C, and O to the surface of the steel plate, for example. An example of the oxidation inhibitor composition includes a phosphoric acid ester compound, an amine-based compound, carbonate compound, a glycol compound, an acetate compound, and the like.

The oxidation inhibitor composition as described above may be added to any of the washing solutions for washing the pickled steel plate such that by the washing process of the pickled steel plate and drying, the anti-yellowing treated steel plate may be prepared. At this time, the P, C, and O are left remaining on the surface of the steel plate by a predetermined amount as described, and accordingly, the anti-yellowing treated steel plate provided in the present disclosure may be obtained.

At this time, the contents of P, C, and O attached to the surface of the steel plate may be obtained by appropriately adjusting the composition of the pickling solution or washing solution. In addition, it may be obtained by adjusting the intervals between washing processes after pickling, or adjusting the time for washing. The method is not particularly limited as long as P, C, and O may be attached in the amount described above.

MODE FOR THE INVENTION

Hereinafter, the present disclosure will be described more specifically with reference to specific Examples. The following Examples are provided to aid understanding of the present disclosure, and the scope of the present disclosure is not limited thereto.

EXAMPLES (Experimental Example 1) Evaluation of Yellowing Prevention Effect According to Composition of the Composition for Washing A material for pickling was prepared by machining a 980 MPa grade hot-rolled steel plate having a thickness of 1.2 mm, and 2.8 w % of manganese and 1.1 w % of silicon into a size of 100×100 mm$^2$ (W/L), and then immersed and pickled in 500 ml of 15 wt % of hydrochloric acid at 80° C. for 30 seconds.

Meanwhile, the resulting pickled steel plate was immersed in 500 ml of distilled water at room temperature for 10 seconds, to which 0.5 w % of the composition for washing according to the present disclosure was added.

At this time, the composition for washing used herein was prepared with the components and in the contents shown in Table 1 below to obtain a final composition for washing. In Table 1 below, water is included in the remaining amount, based on 100 w %.

Meanwhile, the yellowing prevention capability and the solution stability of the steel plate in each composition for washing described above were measured and are shown in Table 1 below.

At this time, the yellowing prevention capability was evaluated based on the following criteria by measuring a yellowness index of the specimen after the pickling with the colorimeter (Minolta Spectrophotometer, CM3700d).
<Evaluation Criteria of Yellowing Prevention Capability>
○: yellowness index of 2 or below
X: yellowness index of greater than 2

Further, the solution stability was evaluated based on the following criteria using a method of storing the crude liquid of the composition for washing in a thermostatic bath at 50° C. for 3 days, measuring the change in viscosity before and after storage, and observing whether sludge was generated, and a method of adding 0.5 wt % of the composition for washing to distilled water, washing the pickled specimen with water, and then observing whether deposit or floating matters occurred.
<Evaluation Criteria for Solution Stability>
○: Viscosity change is within 20%, no sludge and deposit/floating matter occur
X: Viscosity change exceeds 20%, or sludge or deposit/floating matter occur For other items of the problems, it is marked as 0 when there is no other problem, while the problem(s) is briefly described when there are other problems.

TABLE 1

| | Washing solution composition (w %) | | | | | Quality characteristics | | |
| | | | | | | yellowing | | |
| | phosphoric acid ester | Amine compound | Sodium carbonate | Ammonium acetate | EDTA | prevention capability | solution stability | other problem |
|---|---|---|---|---|---|---|---|---|
| Comp. Ex. 1 | 4 | 12 | 6 | 5 | 8 | x | ○ | ○ |
| Ex. 1 | 6 | 12 | 6 | 5 | 8 | ○ | ○ | ○ |

TABLE 1-continued

|  | Washing solution composition (w %) | | | | | Quality characteristics | | |
|---|---|---|---|---|---|---|---|---|
|  | phosphoric acid ester | Amine compound | Sodium carbonate | Ammonium acetate | EDTA | yellowing prevention capability | solution stability | other problem |
| Ex. 2 | 10 | 12 | 6 | 5 | 8 | ○ | ○ | ○ |
| Ex. 3 | 10 | 12 | 6 | 5 | 8 | ○ | ○ | ○ |
| Comp. Ex. 2 | 10 | 12 | 6 | 5 | 8 | ○ | ○ | stain |
| Comp. Ex. 3 | 10 | 4 | 6 | 5 | 8 | x | ○ | ○ |
| Ex. 4 | 10 | 6 | 6 | 5 | 8 | ○ | ○ | ○ |
| Ex. 5 | 10 | 12 | 6 | 5 | 8 | ○ | ○ | ○ |
| Ex. 6 | 10 | 19 | 6 | 5 | 8 | ○ | ○ | ○ |
| Comp. Ex. 4 | 10 | 22 | 6 | 5 | 8 | ○ | x | ○ |
| Comp. Ex. 5 | 10 | 12 | 0 | 5 | 8 | x | ○ | ○ |
| Ex. 7 | 10 | 12 | 1 | 5 | 8 | ○ | ○ | ○ |
| Ex. 8 | 10 | 12 | 6 | 5 | 8 | ○ | ○ | ○ |
| Ex. 9 | 10 | 12 | 9 | 5 | 8 | ○ | ○ | ○ |
| Comp. Ex. 6 | 10 | 12 | 10 | 5 | 8 | ○ | x | ○ |
| Comp. Ex. 7 | 10 | 12 | 6 | 0 | 8 | ○ | x | ○ |
| Ex. 10 | 10 | 12 | 6 | 1 | 8 | ○ | ○ | ○ |
| Ex. 11 | 10 | 12 | 6 | 5 | 8 | ○ | ○ | ○ |
| Ex. 12 | 10 | 12 | 6 | 9 | 8 | ○ | ○ | ○ |
| Comp. Ex. 8 | 10 | 12 | 6 | 10 | 8 | ○ | ○ | odor |
| Comp. Ex. 9 | 10 | 12 | 6 | 5 | 0 | x | ○ | ○ |
| Ex. 13 | 10 | 12 | 6 | 5 | 1 | ○ | ○ | ○ |
| Ex. 14 | 10 | 12 | 6 | 5 | 8 | ○ | ○ | ○ |
| Ex. 15 | 10 | 12 | 6 | 5 | 14 | ○ | ○ | ○ |
| Comp. Ex. 10 | 10 | 12 | 6 | 5 | 16 | ○ | x | ○ |

As shown in Table 1 above, it was found that the pickled composition according to the present disclosure has excellent yellowing prevention capability and solution stability and shows excellent properties without any problems.

(Experimental Example 2) Evaluation of Yellowing Prevention Effect According to pH and Addition Amount of Composition for Washing The composition for washing was diluted with water to use, in which case the same pickling and washing as described in Experimental Example 1 were carried out, while varying the pH and the addition amount of composition for washing, and the yellowing prevention capability of the resulting specimen was evaluated in the same manner as described in Experimental Example 1 and the results are shown in Table 2.

Meanwhile, the solution stability of the composition for washing used for the washing was evaluated in the same manner as described in Experimental Example 1 and the results are also shown in Table 2.

TABLE 2

|  | Washing solution composition condition | | Quality characteristics | | |
|---|---|---|---|---|---|
|  | | | yellowing | | |
|  | pH | addition amount (%) | prevention capability | solution stability | other problem |
| Comp. Ex. 11 | 7.5 | 0.5 | x | ○ | ○ |
| Ex. 16 | 8.5 | 0.5 | ○ | ○ | ○ |
| Ex. 17 | 9.5 | 0.5 | ○ | ○ | ○ |
| Ex. 18 | 11.5 | 0.5 | ○ | ○ | ○ |
| Comp. Ex. 12 | 8.5 | 0.03 | x | ○ | ○ |
| Ex. 19 | 8.5 | 0.05 | ○ | ○ | ○ |
| Ex. 20 | 8.5 | 0.5 | ○ | ○ | ○ |

TABLE 2-continued

|  | Washing solution composition condition | | Quality characteristics | | |
|---|---|---|---|---|---|
|  | | | yellowing | | |
|  | pH | addition amount (%) | prevention capability | solution stability | other problem |
| Ex. 21 | 8.5 | 1.0 | ○ | ○ | ○ |
| Ex. 22 | 8.5 | 1.5 | ○ | ○ | economics |

As noted from Table 2 above, it was found that the specimen pickled using the washing composition that meets the conditions falling within the scope of the present disclosure provided excellent characteristics, including excellent yellowing prevention capability, superior solution stability of the composition for washing, and absence of other problems.

(Experimental Example 3) Evaluation of Whiteness Index Enhancement Effect According to Composition of Composition for Washing A material for pickling was prepared by machining a 980 DP hot-rolled steel plate having a thickness of 1.2 mm, and 2.8 w % manganese and 1.1 w % silicon into a size of 100×100 mm2 (W/L), and then immersed and pickled in 500 ml of 15 wt % of hydrochloric acid at 80° C. for 30 seconds.

Meanwhile, the resulting pickled steel plate was immersed in 500 ml of distilled water at room temperature for 10 seconds, to which 0.5 w % of the composition for washing according to the present disclosure was added.

At this time, the composition for washing used herein was prepared with the components and in the contents shown in Table 3 below to obtain a final composition for washing. In Table 3 below, water is included by the remaining amount based on 100 w %.

Meanwhile, the whiteness index enhancement capability and the solution stability of the steel plate in each composition for washing described above were measured and are shown in Table 3 below.

At this time, the whiteness index enhancement capability was evaluated based on the following criteria, by measuring a whiteness index of the specimen after the pickling with the colorimeter (Minolta Spectrophotometer, CM3700d).

<Evaluation Criteria of Whiteness Index Enhancement Capability>

○: whiteness index of 61 or higher
X: whiteness index of less than 61

In addition, the solution stability was carried out in the same manner as described above in Experimental Example 1.

For other items of the problems, it is marked as 0 when there is no other problem, while the problem(s) is briefly described when there are other problems.

TABLE 3

| | Washing solution composition (w %) | | | | | Quality characteristics | | |
| --- | --- | --- | --- | --- | --- | --- | --- | --- |
| | phosphoric acid ester | citric acid | sodium carbonate | sodiumacetate | DTPA | whiteness index improvement capability | solution stability | other problem |
| Comp. Ex. 1 | 12 | 11 | 6 | 7 | 3 | x | ○ | ○ |
| Ex. 1 | 15 | 11 | 6 | 7 | 3 | ○ | ○ | ○ |
| Ex. 2 | 19 | 11 | 6 | 7 | 3 | ○ | ○ | ○ |
| Ex. 3 | 24 | 11 | 6 | 7 | 3 | ○ | ○ | ○ |
| Comp. Ex. 2 | 26 | 11 | 6 | 7 | 3 | ○ | ○ | stain |
| Comp. Ex. 3 | 19 | 3 | 6 | 7 | 3 | x | ○ | ○ |
| Ex. 4 | 19 | 5 | 6 | 7 | 3 | ○ | ○ | ○ |
| Ex. 5 | 19 | 11 | 6 | 7 | 3 | ○ | ○ | ○ |
| Ex. 6 | 19 | 15 | 6 | 7 | 3 | ○ | ○ | ○ |
| Comp. Ex. 4 | 19 | 17 | 6 | 7 | 3 | ○ | x | ○ |
| Comp. Ex. 5 | 19 | 11 | 1 | 7 | 3 | x | ○ | ○ |
| Ex. 7 | 19 | 11 | 2 | 7 | 3 | ○ | ○ | ○ |
| Ex. 8 | 19 | 11 | 6 | 7 | 3 | ○ | ○ | ○ |
| Ex. 9 | 19 | 11 | 10 | 7 | 3 | ○ | ○ | ○ |
| Comp. Ex. 6 | 19 | 11 | 10 | 7 | 3 | ○ | x | ○ |
| Comp. Ex. 7 | 19 | 11 | 6 | 1 | 3 | ○ | x | ○ |
| Ex. 10 | 19 | 11 | 6 | 2 | 3 | ○ | ○ | ○ |
| Ex. 11 | 19 | 11 | 6 | 7 | 3 | ○ | ○ | ○ |
| Ex. 12 | 19 | 11 | 6 | 12 | 3 | ○ | ○ | ○ |
| Comp. Ex. 8 | 19 | 11 | 6 | 15 | 3 | ○ | ○ | stain |
| Comp. Ex. 9 | 19 | 11 | 6 | 7 | 0 | x | ○ | ○ |
| Ex. 13 | 19 | 11 | 6 | 7 | 1 | ○ | ○ | ○ |
| Ex. 14 | 19 | 11 | 6 | 7 | 3 | ○ | ○ | ○ |
| Ex. 15 | 19 | 11 | 6 | 7 | 7 | ○ | ○ | ○ |
| Comp. Ex. 10 | 19 | 11 | 6 | 7 | 10 | ○ | x | ○ |

As shown in Table 3 above, it was found that the pickled composition according to the present disclosure has excellent whiteness enhancement capability and solution stability and shows excellent properties without any problems.

(Experimental Example 4) Evaluation of Whiteness Index Enhancement Effect According to pH and Addition Amount of Composition for Washing The composition for washing was diluted with water to use, in which case the same pickling and washing as described in Experimental Example 3 were carried out, while varying the pH and the addition amount of composition for washing, and the whiteness index enhancement capability and solution stability of the resulting specimen was evaluated in the same manner as described in Experimental Example 3 and the results are shown in Table 4 below.

TABLE 4

| | Washing solution composition condition | | Quality characteristics | | |
| --- | --- | --- | --- | --- | --- |
| | pH | addition amount (%) | whiteness index improvement capability | solution stability | other problem |
| Comp. Ex. 11 | 7.5 | 0.5 | x | ○ | ○ |
| Ex. 16 | 8.0 | 0.5 | ○ | ○ | ○ |
| Ex. 17 | 9.5 | 0.5 | ○ | ○ | ○ |
| Ex. 18 | 11.5 | 0.5 | ○ | ○ | ○ |
| Comp. Ex. 12 | 8.5 | 0.03 | x | ○ | ○ |
| Ex. 19 | 8.5 | 0.05 | ○ | ○ | ○ |
| Ex. 20 | 8.5 | 0.5 | ○ | ○ | ○ |
| Ex. 21 | 8.5 | 1.0 | ○ | ○ | ○ |
| Ex. 22 | 8.5 | 1.5 | ○ | ○ | economics |

As shown in Table 4 above, it was found that the pickling performed with the composition that meets the ranges according to the present disclosure provided excellent whiteness enhancement capability and solution stability and showed excellent properties without any problems.

Reference Examples 5 to 8

A specimen that was 100 mm×100 mm in width and length was prepared by machining a 980 MPa grade hot-rolled steel plate having a thickness of 1.2 mm and containing 1.1 w % of Si and Mn content as shown in Table 5 below.

Pickling was carried out by immersing each specimen in a 500 ml (80° C.) of pickling solution (15 wt % HCl concentration) for 30 seconds and then the washing was carried out with distilled water.

The yellowness index and whiteness index of each specimen after pickling and washing were measured using a colorimeter (Minolta Spectrophotometer, CM3700d) and the yellowing prevention capability was evaluated according to the occurrence of yellowing. The evaluation was carried out according to the following criteria.

Yellowing prevention capability: yellowness index is at most 4 and whiteness index is at least 55

No yellowing prevention capability: yellowness index is greater than 4 or whiteness index is less than 55

Further, each of the pickled and washed specimens was subjected to surface conditioning and phosphate treating under the following conditions.

Surface Conditioning:

Chemical name: PL-Z (DAEHAN PARKERIZING Co., Ltd.), Concentration: pH 7.5 to 11, Treatment time: 21 sec, Surface conditioning solution temperature: 25 to 35° C.

Phosphate Treatment:

Chemical name: PB-37 (DAEHAN PARKERIZING Co., Ltd.), free acidity: 0.6 to 1 point, treatment time: 80 sec, phosphate treatment solution temperature: 40 to 45° C.

The coating amount of phosphate to each of the phosphate-treated specimens was measured according to the wet process, and the phosphate processability was evaluated based on the coating amount. At this time, evaluation of the phosphate processability was performed according to the following criteria.

○—Good phosphate processability:

coating amount is at least 1.0 g/m$^2$ x—Poor phosphate processability:

coating amount is less than 1.0 g/m$^2$

The results of the evaluation of the yellowing prevention capability and the phosphate processability are shown in Table 5 below.

TABLE 5

| | Specimen steel composition (w %) | Quality characteristics | |
|---|---|---|---|
| specimen No. | Manganese | yellowing prevention capability | phosphate treatment property |
| Reference Ex. 1 | specimen 1 | 0.8 | ○ | ○ |
| Reference Ex. 2 | specimen 2 | 1.0 | x | x |
| Reference Ex. 3 | specimen 3 | 2.8 | x | x |
| Reference Ex. 4 | specimen 4 | 3.5 | x | x |

As noted from Table 5 above, specimen 1 containing less than 1.0 wt % of manganese in the steel composition showed no yellowing, and accordingly, the results indicated that specimen 1 had yellowing prevention capability, and phosphate processability was also indicated to be excellent.

On the other hand, in Experimental Examples 2 to 4 that applied specimens 2 to 4 containing at least 1.0 wt % of manganese content, the results showed that yellowing occurred, and the phosphate processability was also deteriorated.

From these results, it may be confirmed that the steel containing at least 1.0 wt % of manganese needs to be provided with yellowing prevention capability by the yellowing treatment.

Experimental Example 5

Examples 1 to 14 and Comparative Examples 1 to 6

The pickling process was carried out under the same conditions as described above in Reference Example 3 using the same specimen 3 as that used in Reference Example 3 that contains 2.8 wt % of Mn.

The pickled specimen was immersed in 500 ml of washing solution for 10 seconds to be washed. At this time, the base washing solution was prepared by adding 0.5 wt % of an oxidation inhibitor composed of 15 wt % of phosphoric acid ester, 12 wt % of ethylamine, 6 wt % of sodium carbonate, 5 wt % of ammonium acetate, 6 wt % of EDTA, and a remainder of water, to the distilled water.

At this time, the oxidation inhibitor was washed with the same washing solution as described in Examples 1 to 12 and Comparative Examples 1 to 6 of Experimental Example 1.

The yellowness index of the specimens washed with each washing solution was measured to confirm whether the specimens had the yellowing prevention capability.

Further, the P, C, and O contents attached to the surface of each specimen except for the steel component were analyzed by a wet method or a fluorescent X-ray analyzer, and the results are shown in Table 6 below. The specimens were listed in order according to the coating amount of each component, and the presence or absence of yellowing prevention capability in each specimen was also indicated.

Next, after the surface of each washed specimen was subjected to surface adjustment and phosphate treatment in the same manner as described in Reference Example 1, phosphate processability was evaluated in the same manner as described in Reference Example 1, and then surface appearance properties were evaluated in the following manner. The evaluation results are shown in Table 6 below.

The surface appearance properties were evaluated by visually observing the surfaces of the specimens after the washing and the specimens after phosphate treatment in each of the Experimental Examples and the Comparative Examples for presence of stains on the surfaces, and the surface appearance properties were evaluated based on the following criteria.

○—Good surface appearance: No stains

Δ—Medium surface appearance: Minute stains, but acceptable for sale x—Poor surface appearance: Severe stains

TABLE 6

| | Steel plate surface coating amount (mg/m$^2$) | | | | Quality characteristics | | |
|---|---|---|---|---|---|---|---|
| | | | | | yellowing prevention capability | phosphate treatment property | surface appearance |
| | P | C | O | N + S + Na | | | |
| Comp. Ex. 1 | 0.005 | 1.1 | 2 | 0 | x | x | Δ |
| Ex. 1 | 0.01 | 1.1 | 2 | 0 | ○ | ○ | Δ |
| Ex. 2 | 0.5 | 1.1 | 2 | 0 | ○ | ○ | Δ |
| Ex. 3 | 5 | 1.1 | 2 | 0 | ○ | ○ | Δ |
| Comp. Ex. 2 | 7 | 1.1 | 2 | 0 | x | ○ | x |
| Comp. Ex. 3 | 0.5 | 0.005 | 2 | 0 | x | x | Δ |
| Ex. 4 | 0.5 | 0.01 | 2 | 0 | ○ | ○ | Δ |
| Ex. 5 | 0.5 | 200 | 2 | 0 | ○ | ○ | Δ |
| Ex. 6 | 0.5 | 500 | 2 | 0 | ○ | ○ | Δ |
| Comp. Ex. 4 | 0.5 | 550 | 2 | 0 | ○ | x | x |
| Comp. Ex. 5 | 0.5 | 1.1 | 0.05 | 0 | x | x | Δ |
| Ex. 7 | 0.5 | 1.1 | 0.1 | 0 | ○ | ○ | Δ |
| Ex. 8 | 0.5 | 1.1 | 250 | 0 | ○ | ○ | Δ |
| Ex. 9 | 0.5 | 1.1 | 500 | 0 | ○ | ○ | Δ |
| Comp. Ex. 6 | 0.5 | 1.1 | 550 | 0 | x | x | x |
| Ex. 10 | 0.5 | 1.1 | 2 | 0.005 | ○ | ○ | Δ |
| Ex. 11 | 0.5 | 1.1 | 2 | 0.01 | ○ | ○ | ○ |
| Ex. 12 | 0.5 | 1.1 | 2 | 0.5 | ○ | ○ | ○ |
| Ex. 13 | 0.5 | 1.1 | 2 | 5 | ○ | ○ | ○ |
| Ex. 14 | 0.5 | 1.1 | 2 | 7 | ○ | ○ | Δ |

As noted from Table 6 above, the surfaces of the specimens having yellowing prevention capability after pickling and washing contained P in a range of 0.01 to 5 mg/m$^2$, C in a range of 0.01 to 500 mg/m$^2$, and O in a range of 0.01 to 500 mg/m$^2$.

In addition, the specimens having the yellowing prevention capability also showed excellent phosphate processabilities, along with good surface appearance properties.

However, when the coating amount of P is less than 0.01 mg/m$^2$ (Comparative Example 1), or the coating amount of C is less than 0.01 mg/m$^2$ (Comparative Example 3), or the coating amount of O is less than 0.1 mg/m$^2$ (Comparative Example 5), the measured yellowness index exceeded 4, and the measured whiteness index was less than 55, which showed poor yellowing prevention capability.

In addition, the coating amount of the phosphate was less than 1.0 g/m$^2$, indicating that phosphate treatment property was also poor.

Meanwhile, when the coating amount of P, C or O exceeded the ranges defined in the present disclosure and was thus adhered in excessive amount (Comparative Examples 2, 4, and 6), the results showed that the yellowing prevention capability was rather lowered, and the presence of severe stains on the surface deteriorated surface appearance to an extent that the specimens were evaluated to be defective. Further, Comparative Example 6 showed the results of deteriorated phosphate processability.

From the above results, when the P, C, and O contents are attached to the surface of the steel plate after pickling and washing within the ranges suggested in the present disclosure, it can be appreciated that excellent yellowing suppressing effect as well as excellent phosphate processability is provided.

In addition, in Examples 10 to 14, N, S, and Na were additionally attached to the surface of the specimen after pickling and washing, in addition to the P, C, and O contents being attached according to the ranges of the present disclosure.

As shown in Example 10, the total coating amount of N+Na+S was 0.005 mg/m$^2$, which was less than 0.1 mg/m$^2$, and therefore, no further improvement of the surface appearance properties was obtained. However, in Examples 11 to 13 having at least 0.1 mg/m$^2$ of total coating amount of N+Na+S, the results showed that both phosphate processability and surface appearance were excellent.

However, when the total coating amount was 7 mg/m$^2$ that is greater than 5 mg/m$^2$, the results showed that the surface appearance properties were not improved any more, with the severe stains appearing on the surface appearance.

Therefore, it can be understood that N, S, and Na may be attached to the surface of the pickled and washed steel plate, the content thereof may be in the range of 0.2 to 5 mg/m$^2$ to ensure that intended result is obtained.

Further, to confirm the relationship between the surface quality characteristics and the surface chromaticity, the yellowness index and whiteness index of the specimens of Comparative Examples 1, 3 and 5, which showed poor quality characteristics, and Comparative Examples 2, 5, 7 and 12 which showed good quality characteristics, were measured and the results are shown in Table 7 below.

TABLE 7

| | Steel plate surface coating amount (mg/m$^2$) | | | Surface chromaticity | | Quality characteristics | | |
|---|---|---|---|---|---|---|---|---|
| | P | C | O | yellowness index | whiteness index | yellowing prevention capability | phosphate treatment property | surface appearance |
| Comp. Ex. 1 | 0.005 | 1.1 | 2 | 4.5 | 52 | x | x | Δ |
| Ex. 2 | 0.5 | 1.1 | 2 | 4.0 | 58 | ○ | ○ | Δ |

TABLE 7-continued

| | Steel plate surface coating amount (mg/m²) | | | Surface chromaticity | | Quality characteristics | | |
|---|---|---|---|---|---|---|---|---|
| | P | C | O | yellowness index | whiteness index | yellowing prevention capability | phosphate treatment property | surface appearance |
| Comp. Ex. 3 | 0.5 | 0.005 | 2 | 4.2 | 54 | x | x | Δ |
| Ex. 5 | 0.5 | 200 | 2 | 1.0 | 71 | ○ | ○ | Δ |
| Comp. Ex. 4 | 0.5 | 550 | 2 | 4.1 | 54 | ○ | x | x |
| Comp. Ex. 5 | 0.5 | 1.1 | 0.05 | 4.6 | 50 | x | x | Δ |
| Ex. 7 | 0.5 | 1.1 | 0.1 | 3.7 | 55 | ○ | ○ | Δ |
| Ex. 12 | 0.5 | 1.1 | 2 | 1.0 | 75 | ○ | ○ | ○ |

As noted from Table 7 above, when the surface chromaticity of the steel plate after pickling and washing satisfies the ranges of the present disclosure, it can be appreciated that the surface appearance and the phosphate processability are excellent.

Although the embodiments of the present disclosure have been described in detail, the scope of the present disclosure is not limited thereto, and it will be apparent to those skilled in the art that various changes and modifications may be made without departing from the spirit and scope of the disclosure as defined in the appended claims.

The invention claimed is:

1. A composition for washing a pickled steel plate comprising 15 to 24 wt % of a phosphoric acid ester compound, 5 to 15 wt % of citric acid, 2 to 10 wt % of sodium carbonate, 2 to 7 wt % of sodium acetate, 1 to 7 wt % of diethylene tetraamine pentaacetic acid (DTPA) and a remainder of water.

2. The composition for washing of claim 1, wherein the phosphoric acid ester compound is at least one compound selected from the group consisting of bisphenol A-bis(diphenyl phosphate), triaryl phosphate isopropylate, dimethylmethyl phosphate, tetraphenyl m-phenylene bis(phosphate), triethyl phosphate and triphenyl phosphate.

3. The composition for washing of claim 1, wherein the composition for washing has a pH of at least 8.0.

4. The composition for washing of claim 1, wherein the composition for washing has a pH of 8.5 to 11.5.

5. The composition for washing of claim 1, wherein the composition when used for washing is diluted in an amount of 0.05 to 1.5 wt % with water.

6. A method for washing a pickled steel plate, comprising:
preparing a composition for washing a pickled steel plate by mixing 15 to 24 wt % of a phosphoric acid ester compound, 5 to 15 wt % of citric acid, 2 to 10 wt % of sodium carbonate, 2 to 7 wt % of sodium acetate, 1 to 7 wt % of diethylene tetramine pentaacetic acid (DTPA) and a remainder of water;
diluting the composition for washing with water; and
immersing the pickled steel plate in the composition for washing.

7. The method for washing of claim 6, wherein the diluting the composition for washing with water is performed by diluting 0.05 to 1.5 wt % of the composition for washing with water.

8. The method for washing of claim 6, wherein the phosphoric acid ester compound is at least one compound selected from the group consisting of bisphenol A-bis(diphenyl phosphate), triaryl phosphate isopropylate, dimethylmethyl phosphate, tetraphenyl m-phenylene bis(phosphate), triethyl phosphate and triphenyl phosphate.

9. The method for washing of claim 6, wherein the composition for washing has a pH of at least 8.0.

10. The method for washing of claim 6, wherein the composition for washing has a pH of 8.5 to 11.5.

* * * * *